March 24, 1959     A. SCHWINGER     2,878,746
COLD WATER COFFEE BREWER
Filed Oct. 3, 1956

INVENTOR.
ABRAM SCHWINGER
BY Harry Sargeam
ATTORNEY

United States Patent Office 2,878,746
Patented Mar. 24, 1959

2,878,746
COLD WATER COFFEE BREWER
Abram Schwinger, Philadelphia, Pa.
Application October 3, 1956, Serial No. 613,717
1 Claim. (Cl. 99—283)

My invention relates to a coffee brewer, and, more particularly, relates to a brewer wherein cold water is recirculated through the coffee grounds.

The usual coffee makers or brewers are of one of two types, both of which utilize boiling water to steep and extract the flavor from the coffee grounds. The percolator type brewer accomplishes this purpose by heating and boiling the water which is then percolated to a position above the coffee grounds whence the boiling water falls by gravity to the bottom of the pot to be recirculated until the desired strength is accomplished. The drip type brewer utilizes finer grain coffee particles and the boiling water is passed through the grounds just once. However, it has been observed that utilizing boiling water produces coffee which has poor storage properties. Furthermore, reheating the once brewed coffee causes a loss of flavor, rancidity and a heavy body.

It is, therefore, an object of my invention to provide a coffee brewer wherein the coffee produced will retain its flavor over a long period of time without becoming rancid.

Another object of my invention is to provide a coffee brewer wherein the liquid coffee is produced by recirculating cold water through the coffee grounds.

Another object of my invention is to provide a coffee brewer wherein the liquid coffee may be made commercially and sold in a container to be thereafter merely heated by the consumer for a full bodied flavorful cup of coffee.

Another object of my invention is to provide a coffee brewer which prevents excessive accumulation of caffeine in coffee which is made therein.

Another object of my invention is to provide a coffee brewer wherein a minimum amount of coffee grounds is required to make coffee.

Another object of my invention is to provide a method for extracting flavor, vitamins and minerals from coffee grounds, fruits or vegetables without destruction of nourishing or flavorful elements in the resultant brew.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawing, in which.

Referring now in greater detail to the drawing in which similar reference characters refer to similar parts, I show a coffee brewer comprising a coffee pot or container, generally designated as A, a material retainer, generally designated as B, and a circulator assembly, generally designated as C.

Figure 1:
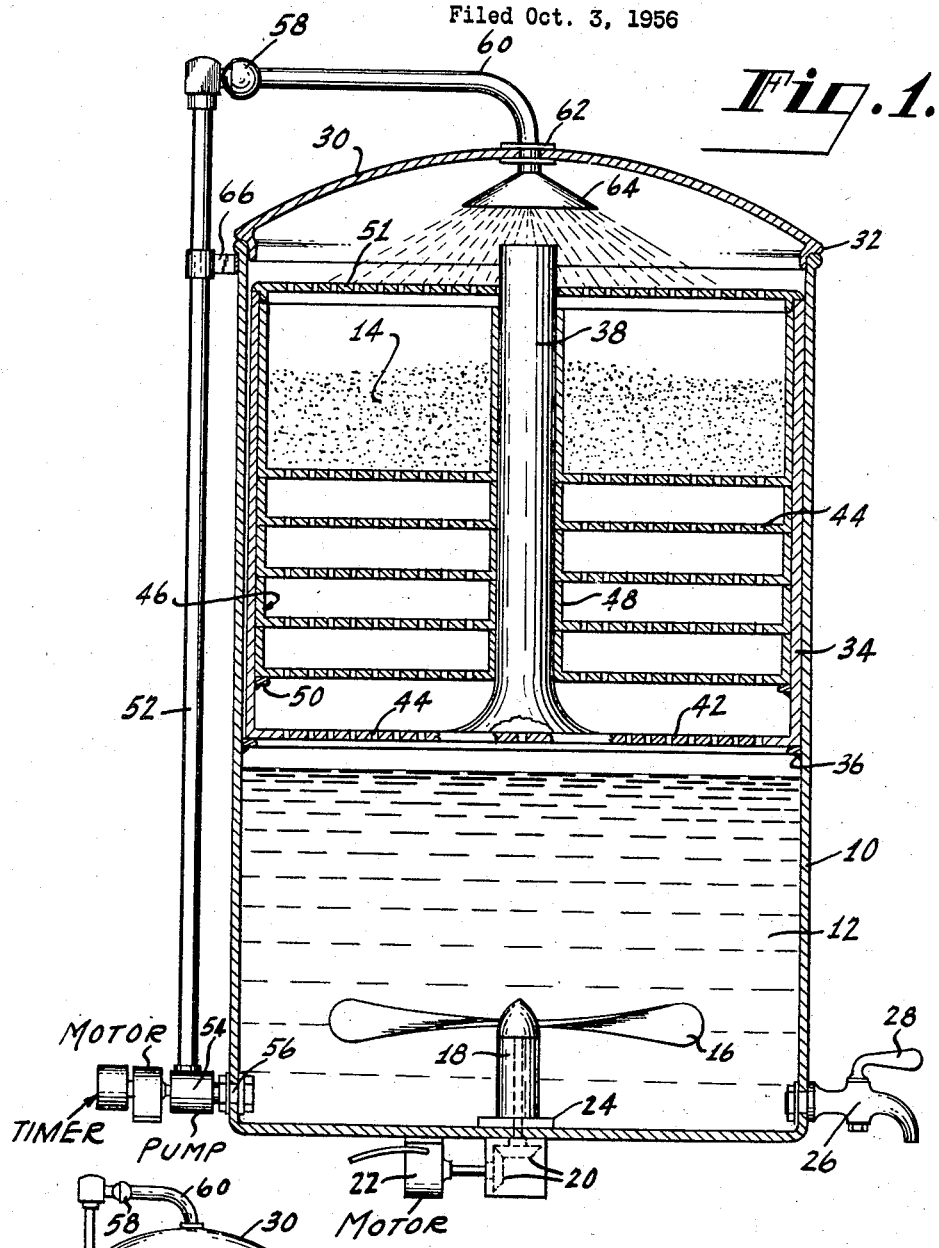
Fig. 1 is a sectional view showing a coffee brewer embodying my invention.
Figure 2:
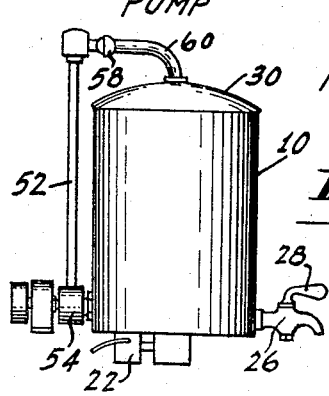
Fig. 2 is a perspective view of the coffee brewer.

The container A comprises a generally cylindrical shell 10 for holding at its lower portion a liquid 12, the liquid being water or similar fluid which when passed through the retainer B extracts the soluble matter from the material 14 therein. At the very lowermost portion of the shell 10 and preferably at its center portion, is a rotary agitator 16 which is driven through a spindle 18, and bevel gears 20 by an electrically operated motor 22. A conventional seal 24 maintains the container A water tight at its bottom to prevent seepage of any liquid therefrom. A spout 26 operated by a petcock is also sealed upon the external cylindrical shell 10 and enables removal of the liquid 12 from the container. At the upper portion of the container A is a dome-shaped lid 30 which is detachably secured upon the open mouth of the container by means of flanges 32.

The retainer B comprises a cylindrical internal shell 34 which is adapted to fit within the external container A and held therein at its upper half thereof by protrusions 36 integrally firm upon the interior of the shell 10. The cylindrical internal shell 34 has a tube 38 extending upwardly from its center portion thereof, the upper portion of the tube being level with the upper end of the shell 10 for returning excessive fluid directly to the lower portion of the container A without passing through the material to be leached. The bottom portion 42 of the internal shell 34 is foraminous to enable coffee grounds or other material to be placed thereon and at the same time to enable the liquid to pass through a drip therefrom. A series of foraminous shelves 44 having external flanges 46 and central hollow necks 48 are stacked upon each other about the tube 38 within the internal shell 34, the lowermost shelf being spaced from the foraminous plate 42 and supported within the shell 34 by an annular ring 40 extending therefrom. A foraminous lid 51 fits to the upright tube 38 and is supported by the upper portion of the shell 34.

The circulator assembly C comprises an external pipe 52 which extends vertically from an electrically operated motor driven pump 54. The pump 54 communicates directly with the lower portion of the container A through a sealed orifice 56. The upper portion of the external pipe 52 has a ball joint 58 from which extends a pivotally mounted channel 60, the latter of which extends downwardly through a grommet 62 in the lid 30. A sprinkler head 64 is fastened to the bottommost portion of channel 60 to enable the liquid to be distributed over the entire area of the foraminous lid 51. The external pipe 52 is further separated and restricted in position upon the container A by means of a bracket 66 fastened to the shell 10 and encircling the external pipe.

It is to be observed that the lid 30 may be removed from the mouth of the container A lifting upwardly upon the channel 60 and simultaneously swinging the channel horizontally to the ball joint 58.

The material from which the extractable matter is to be leached is placed upon each of the shelves 44 as well as upon the foraminous bottom 42 and the entire assembly B placed within the container A by stacking each of the shelves about the central tube 38.

It is to be further observed that in no instance is my coffee brewer heated in order to circulate or percolate the liquid 12 from the retainer B. It is a completely cold process that is utilized whereby operation of the matter 54 will pump the fluid from the bottom of the container upward through a circulator assembly C and thereon to be sprayed from the sprinkler head 64 upon the upper surface of the foraminous lid 51. The lid 12 will seep by gravity through each of the shelves in the retainer B extracting soluble matter from the material placed upon each of the shelves. Any excessive liquid which does not immediately pass through the material placed upon the upper shelf will be carried through the top of tube 38 and pass immediately downward through tube 38.

This construction accelerates the movement over the coffee grounds or other material to provide a better taste. The water therefor flows directly and indirectly on to the containing shelves 44 instead of passing through other barriers where some of the flavor may be lost. In this manner the liquid is enabled to extract the full essence of coffee which cannot otherwise be accomplished by the percolation method. A timer is also provided for controlled operation of the pump whereby accurate brewing flavor and strength may be obtained.

Furthermore, because of my cold extraction method the objectionable rancidity is not produced but after the cold extraction the coffee or other solution 12 may be poured directly into containers and heated when ready to consume.

My cold extraction process can also be used upon finely chopped vegetables which may be placed upon the shelves of the retainer B, and vitamins as well as other minerals such as phosphorus, silicon, lime, iron, iodine, etc., may be extracted therefrom. It is to be observed that no deterioration will occur with regard to these vitamins because no heat is applied to break up the vitaminic complexes.

It is also to be further observed that the agitator 16 maintains the liquid 12 in active movement and prevents any finely divided particles from settling.

It is to be noted that the time for the passage of the water from the lower portion of the chamber through the sprinkler 64 is controlled by a timer 55 and the water should preferably be cooled. However, the water, before it is inserted in the shell 10 should be boiled to remove bacteria and other impurities and then permitted to cool.

Although my invention has been described in considerable detail, such description is intended as being illustrative rather than limiting, since the invention may be variously embodied, and the scope of the invention is to be determined as claimed.

I claim as my invention:

A coffee brewer comprising a container having a cylindrical side wall, a closed bottom and an open top, a plurality of protrusions integrally projecting from the interior of said side wall at an intermediate portion thereof, an internal cylindrical shell having a foraminous bottom detachably interfitting within said side wall upon said protrusions, a centrally disposed tube upwardly extending from the foraminous bottom, an annular ring inwardly projecting from the interior of said cylindrical shell and spaced from the foraminous bottom thereof, a plurality of foraminous shelves, each having an external flange complementary with the interior of said shell and a central neck portion complementary with said tube, said shelves being vertically stacked one upon the other on the respective flange and neck portions thereof, a foraminous lid detachably interfitting with the top of said shell, a detachable dome-shaped cover interfitting with the top of said container, an electrically driven agitator projecting upwardly into said container through an aperture in the bottom thereof, a sprinkler head downwardly extending from said cover through a grommet therein, an L-shaped tubular channel communicating at one end with said sprinkler, a ball joint pivotally mounted on the other end of said channel, a vertical pipe affixed to the exterior of said container and having the upper end communicating with said channel through said ball joint, a pump mounted upon the lower end of said pipe and having the suction side thereof communicating with the interior of said container through the lowermost portion of the side wall thereof, an electric motor driving said pump, and a timer controlling said motor whereby cold liquid within said container may be recirculated by said pump for accurate controlled extraction of essences from ground coffee contained on said shelves, and the liquid containing the extracted essences maintained in homogeneous suspension.

References Cited in the file of this patent

UNITED STATES PATENTS

| | | |
|---|---|---|
| 95,710 | Moneuse et al. | Oct. 12, 1869 |
| 433,673 | Colby | Aug. 5, 1890 |
| 1,226,005 | Rathman | May 15, 1917 |
| 1,678,543 | Watson | July 24, 1928 |
| 1,709,657 | Clinton | Apr. 16, 1929 |
| 2,263,610 | Cain | Nov. 25, 1941 |
| 2,414,521 | Gunther | Jan. 21, 1947 |
| 2,515,730 | Ornfelt | July 18, 1950 |
| 2,718,844 | Schwinger | Sept. 27, 1955 |

FOREIGN PATENTS

| | | |
|---|---|---|
| 230,256 | Germany | Jan. 19, 1911 |